US012561452B2

(12) United States Patent
Kar et al.

(10) Patent No.: US 12,561,452 B2
(45) Date of Patent: Feb. 24, 2026

(54) VIRTUALIZING SECURE VAULT OF DATA PROCESSING UNIT FOR SECURE HARDWARE SECURITY MODULE FOR HOSTS

(71) Applicant: Cisco Technology, Inc., San Jose, CA (US)

(72) Inventors: Chakradhar Kar, San Jose, CA (US); Sri Goli, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 18/369,070

(22) Filed: Sep. 15, 2023

(65) Prior Publication Data

US 2025/0094601 A1      Mar. 20, 2025

(51) Int. Cl.
*G06F 21/60* (2013.01)
*G06F 21/57* (2013.01)
*G06F 21/72* (2013.01)

(52) U.S. Cl.
CPC .......... *G06F 21/602* (2013.01); *G06F 21/572* (2013.01); *G06F 21/72* (2013.01)

(58) Field of Classification Search
CPC ....... G06F 21/602; G06F 21/572; G06F 21/72
See application file for complete search history.

(56) References Cited

U.S. PATENT DOCUMENTS

| | | | |
|---|---|---|---|
| 8,694,781 B1 | 4/2014 | Griffin et al. | |
| 2008/0022129 A1* | 1/2008 | Durham ................ | H04L 9/3236 |
| | | | 713/189 |
| 2009/0055641 A1 | 2/2009 | Smith | |
| 2017/0214694 A1 | 7/2017 | Yan | |
| 2020/0396065 A1* | 12/2020 | Gutierrez-Sheris ......................... | |
| | | | H04L 9/3239 |
| 2022/0012149 A1 | 1/2022 | Doshi et al. | |
| 2022/0222099 A1 | 7/2022 | Srivastava et al. | |
| 2022/0374512 A1* | 11/2022 | Gerganov ........... | G06F 9/45558 |
| 2023/0051347 A1* | 2/2023 | Sakib .................. | G06F 9/45558 |

OTHER PUBLICATIONS

Raj, et al., "fTPM: A Software-only Implementation of a TPM Chip", retrieved on Sep. 28, 2022 at <<http://www.unisex.org/sites/default/files/sec16-full_proceedings_interior.pdf>>USENIX, The Advanced Computing Systems Association, Sep. 28, 2022, pp. 852-867.
Search Report and Written Opinion for International Application No. PCT/US2024/045634, Dated Nov. 28, 2024, 13 pages.

* cited by examiner

*Primary Examiner* — William S Powers
(74) *Attorney, Agent, or Firm* — Lee & Hayes, P.C.

(57) ABSTRACT

A system and method of securing and virtualizing firmware trusted platform modules (TPMs) for virtualizing a hardware security module (HSM) for a host within a network fabric is provided. The system and method include operably coupling a set of components associated with a host comprising a data processing unit (DPU) secure vault and a firmware trusted platform module (TPM). The firmware TPM is configured as a virtual firmware TPM. The DPU secure vault secures the virtual firmware TPM into one or more virtual firmware TPMs based on one or more partitions configured with the DPU secure vault. A virtual TPM manager communicatively coupled to the DPU secure vault manages one or more virtual TPMs for hosting a set of Virtual Machines (VMs) or Containers.

17 Claims, 7 Drawing Sheets

Virtualizing Firmware TPM for VMs

100

Virtualizing Firmware TPM for VMs

200

Virtualizing Firmware TPM for Containers

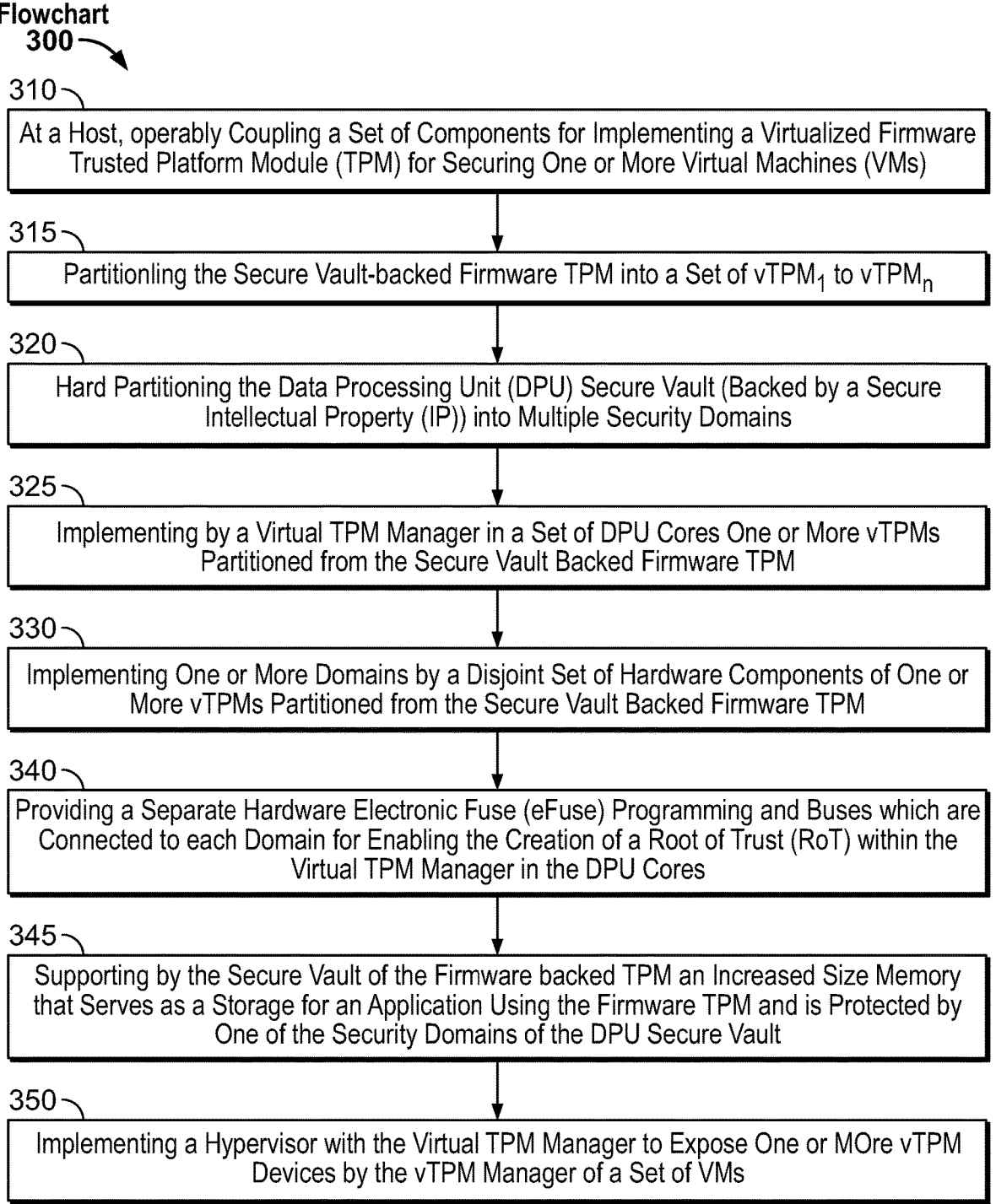

Flowchart
300

310

At a Host, operably Coupling a Set of Components for Implementing a Virtualized Firmware Trusted Platform Module (TPM) for Securing One or More Virtual Machines (VMs)

315

Partitionling the Secure Vault-backed Firmware TPM into a Set of $vTPM_1$ to $vTPM_n$

320

Hard Partitioning the Data Processing Unit (DPU) Secure Vault (Backed by a Secure Intellectual Property (IP)) into Multiple Security Domains

325

Implementing by a Virtual TPM Manager in a Set of DPU Cores One or More vTPMs Partitioned from the Secure Vault Backed Firmware TPM

330

Implementing One or More Domains by a Disjoint Set of Hardware Components of One or More vTPMs Partitioned from the Secure Vault Backed Firmware TPM

340

Providing a Separate Hardware Electronic Fuse (eFuse) Programming and Buses which are Connected to each Domain for Enabling the Creation of a Root of Trust (RoT) within the Virtual TPM Manager in the DPU Cores

345

Supporting by the Secure Vault of the Firmware backed TPM an Increased Size Memory that Serves as a Storage for an Application Using the Firmware TPM and is Protected by One of the Security Domains of the DPU Secure Vault

350

Implementing a Hypervisor with the Virtual TPM Manager to Expose One or MOre vTPM Devices by the vTPM Manager of a Set of VMs

FIG. 3

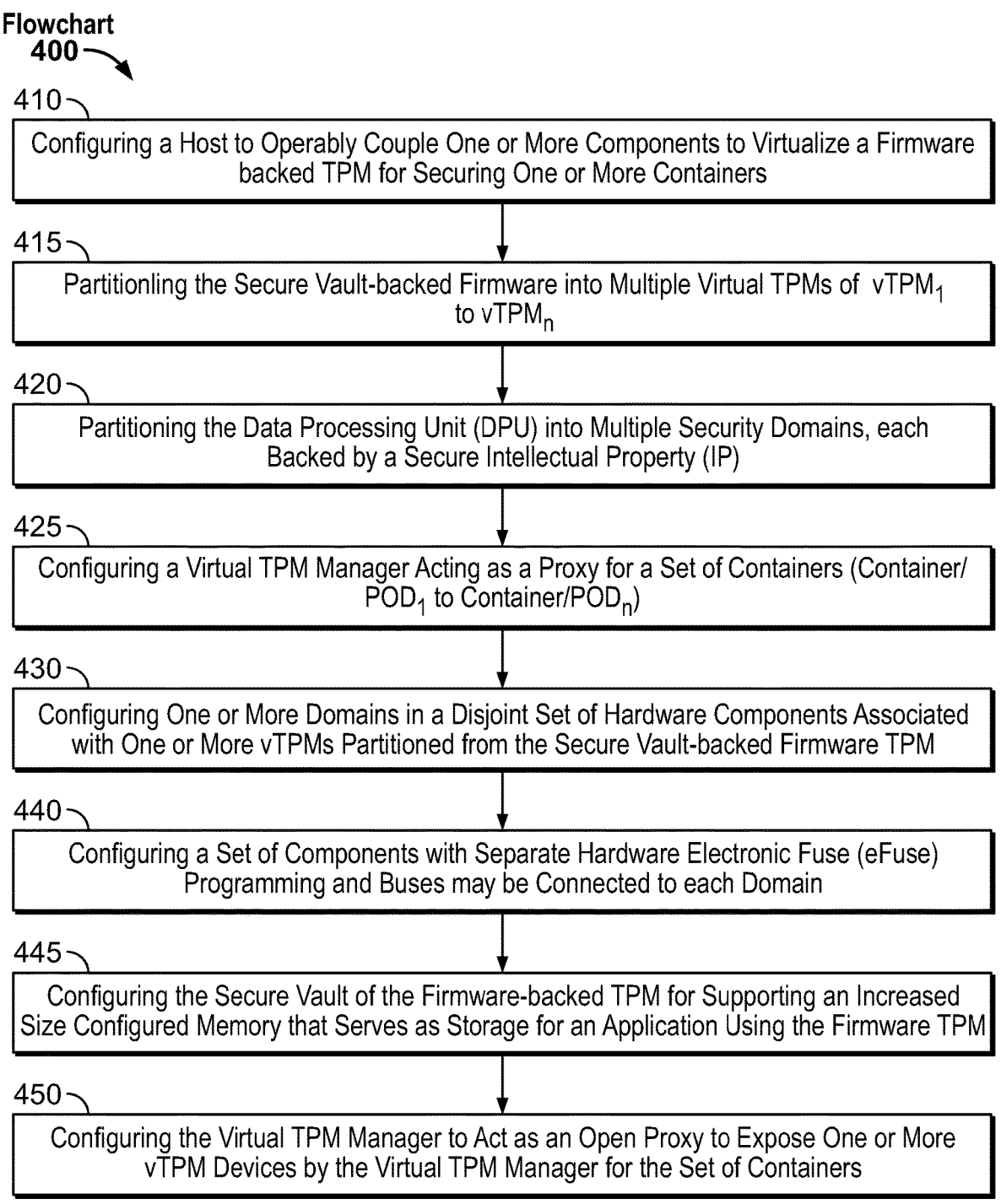

Flowchart
400

410
Configuring a Host to Operably Couple One or More Components to Virtualize a Firmware backed TPM for Securing One or More Containers 415
Partitionling the Secure Vault-backed Firmware into Multiple Virtual TPMs of $vTPM_1$ to $vTPM_n$ 420
Partitioning the Data Processing Unit (DPU) into Multiple Security Domains, each Backed by a Secure Intellectual Property (IP)

425
Configuring a Virtual TPM Manager Acting as a Proxy for a Set of Containers (Container/ $POD_1$ to Container/$POD_n$)

430
Configuring One or More Domains in a Disjoint Set of Hardware Components Associated with One or More vTPMs Partitioned from the Secure Vault-backed Firmware TPM 440
Configuring a Set of Components with Separate Hardware Electronic Fuse (eFuse) Programming and Buses may be Connected to each Domain 445
Configuring the Secure Vault of the Firmware-backed TPM for Supporting an Increased Size Configured Memory that Serves as Storage for an Application Using the Firmware TPM 450
Configuring the Virtual TPM Manager to Act as an Open Proxy to Expose One or More vTPM Devices by the Virtual TPM Manager for the Set of Containers

FIG. 4

VIRTUALIZING SECURE VAULT OF DATA PROCESSING UNIT FOR SECURE HARDWARE SECURITY MODULE FOR HOSTS

TECHNICAL FIELD

The present disclosure relates generally to computer network security. Specifically, the present disclosure relates to systems and methods for creating a fabric-based root-of-trust that provides a trust zone environment for computing and network elements.

BACKGROUND

Computing and computing networks have become or are becoming ubiquitous in our home and work environments. In most instances, a computing network may be secured to ensure that proprietary or private information is not compromised. Further, computer applications are transitioning from monolithic architectures including a unified model composed all in one piece for the design of a software program to distributed microservices. Thus, computing environments no longer include a set of specialized servers, but, instead, a hive of highly interconnected stateless machines. These interconnected hives may be referred to as a computing fabric. During this transition, the security and trust models for devices within and accessing the computing fabric are evolving away from a singleton, server-centric implementation towards a collective distributed fabric Root-of-Trust (RoT). Identity management solutions may enable automated provisioning, updates, and de-provisioning of devices. However, these identity management solutions do not account for the unmet need for using machine identity to enable a collective trust zone environment.

The Trusted Platform Module (TPM) has become a common hardware feature, with deployed computers that have TPM hardware. The purpose of TPM hardware, and the software that supports it, is to increase the security of computer systems. TPMs may be found in x86 PCs as small integrated circuits on motherboards that connect to the low pin count (LPC) bus. Each TPM contains an RSA (public-key) cryptography unit and platform configuration registers (PCRs) that maintain cryptographic hashes (called measurements by the Trusted Computing Group (TCG)) of code and data that has run on the platform. TPMs can provide software attestation, proof of what software is running on a platform when the TPM is invoked.

It is desirable to implement a virtualized firmware TPM for Virtual Machines (VMs) and Containers with a secure vault-backed firmware TPM as a built-in Hardware Security Module (HSM) that may be used in existing security solutions and may leverage the standard TPM style open APIs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates an exemplary flowchart for virtualizing a firmware Trusted Platform Module (TPM) for one or more Virtual Machines (VMs) according to some embodiments.

FIG. 4 illustrates an exemplary flowchart for virtualizing a firmware Trusted Platform Module (TPM) for one or more containers according to some embodiments.

DESCRIPTION OF EXAMPLE EMBODIMENTS

Figure 1:
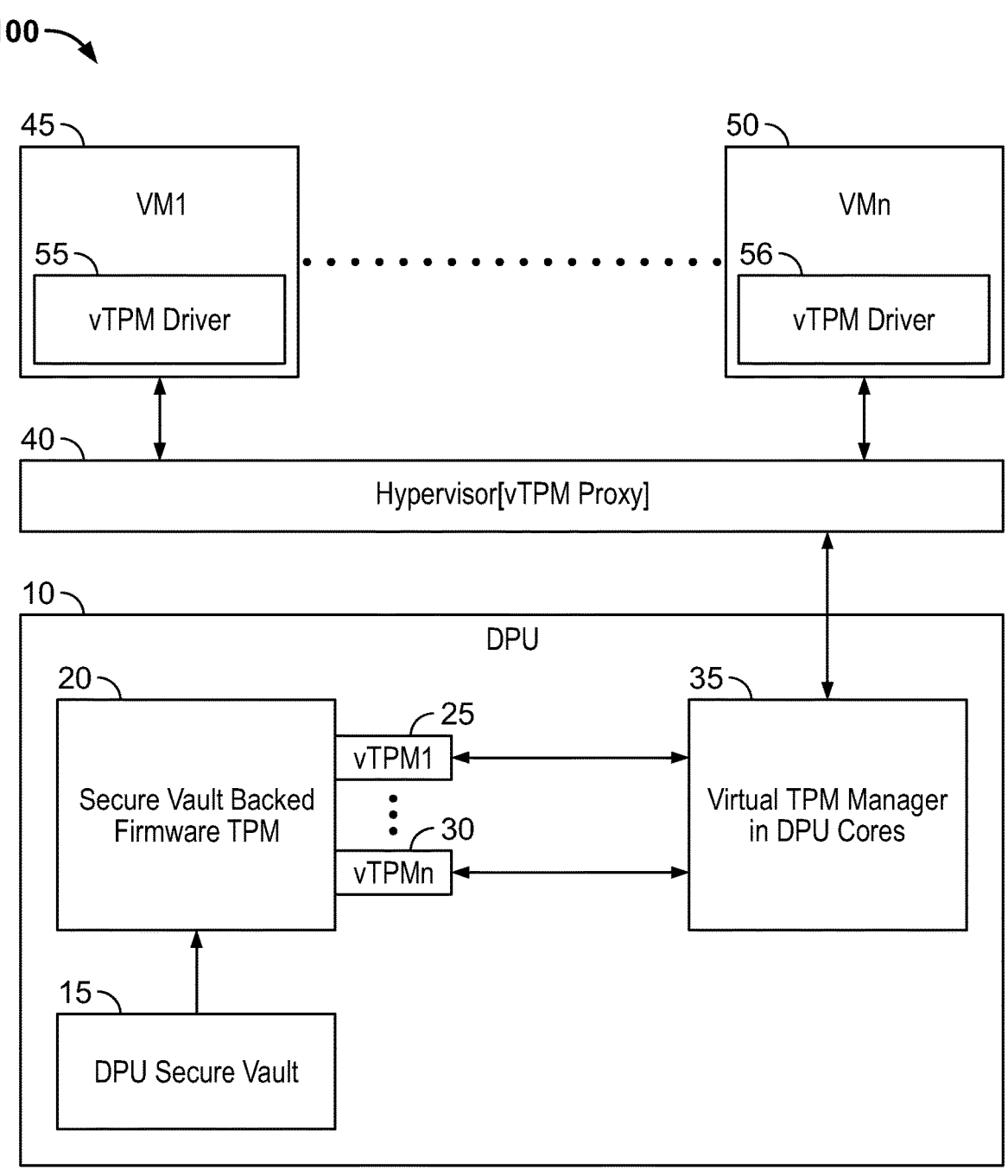
FIG. 1 illustrates an architecture of a virtualizing firmware Trusted Platform Module (TPM) for multiple Virtual Machines (VMs) according to some embodiments.

As security is virtualized, this can allow for a containerized host in a zero-trust environment to be implemented. Enterprises may be configured to deploy the external Hardware Security Model (HSM) model for securing Virtual Machines (VMs) and for container security. The HSM may be considered a physical computing device that safeguards and manages digital keys for authentication and provides crypto functions. In some embodiments, an HSM is configured as a security device that can be added or integrated into a system to manage, generate, and securely store cryptographic keys. In some embodiments, the Trusted Platform Module (TPM) is configured as a chip embedded into the motherboard. Attaching a secure keystore with an HSM model (e.g., YubiHSM or an Enterprise Licensed HSM) can prove a costly matter and especially if required for every host. In the case of a Fabric-ROT data processing unit (DPU), it is protected by network fabric and hence the DPU's secure vault may be configured to be used as HSM. In some embodiments, for example, a DPU secure vault can be partitioned with eFuse for physical separation of security domains and a virtualizing of a secure domain that can enable exposing those virtual domains to provide independent secure vaults to individual connected VMs and Containers to the host.

In some embodiments, the benefits of DPU-based HSM include not incurring the extra cost of HSM, enhanced security backed by a DPU-enabled Root of Trust (ROT) and a Fabric-ROT, and the virtualizing of DPU's firmware TPM for standard TPM style open APIs as a firmware TPM (fTPM). In some embodiments, the firmware TPM functionalities may be configured for protecting the VMs, at the launch time and migration and throughout the whole VM lifecycle. At the time of VM launch, both the client VM and the cloud provider platform must have mutual trust in each other. In some embodiments, the firmware TPM may be configured to store and generate private keys for encryption, and the firmware TPM may be configured for use as a built-in HSM.

In the present disclosure, references to TPM are not to a regular TPM but to a firmware TPM.

In some embodiments, a firmware TPM is implemented which is a software-based platform application whereas a TPM may be considered a hardware-based platform. In some embodiments, secure domains are configured to be applicable to or only to a secure vault which is partitioned by eFuses. For example, a single or one secure configured partition is implemented to protect a firmware TPM that is being executed or invoked within a DPU ARM core. The firmware TPM may also be further logically partitioned for controlling VMs and Containers in a network.

In some embodiments, the firmware TPM may be defined as a firmware TPM that is implemented or invoked in protected software. The code associated with the protected software is invoked and executed on the main CPU, so a separate chip is not required. Similar to the execution of other programs by the main CPU, the code is executed but invoked in a protected execution environment known as a trusted execution environment (TEE) that is separated from the rest of the programs that are being executed on the CPU. This prevents access to certain secured data such as private keys used by the TPM that are not to be accessed by unauthorized parties (i.e., hackers or others) and may be installed in the TEE.

Overview

In some embodiments, one or more methods may be established for securing and virtualizing domains of a host within a network fabric. The host may include operably coupling a set of components including a secure vault of a Data Processing Unit (DPU), a Trusted Platform Module (TPM), and a firmware TPM. The secure vault of a DPU may be configured to secure the TPM by firmware into one or more domains. The DPU secure vault may be partitioned into one or more secure domains, and one or more secure partitions of the DPU is protecting one or more firmware TPMs being executed inside DPU ARM cores. Also, one or more partitions is protecting a corresponding firmware TPM which may be configured into one or more secure virtual firmware TPMs controlled by a virtual TPM manager. In other words, the firmware TPM may be virtualized into multiple virtual TPMs managed by a virtual TPM manager. A hypervisor may be configured to communicate with at least one virtual TPM driver and with the virtual TPM manager to host one or more Virtual Machines (VMs).

In some embodiments, one or more methods may be established for securing and virtualizing firmware TPMs of a host within a network fabric by operably coupling a set of components associated with the host comprising a DPU secure vault, and firmware TPM. Then, securing by the DPU secure vault, the firmware TPM into one or more protected firmware TPMs by one or more secure partitions. The DPU secure vault may be partitioned into one or more secure domains and secure, based on partitioning of the DPU, one or more firmware TPMs that are virtualized into one or more secure virtual firmware TPMs, each protected by an ARM core domain of the secure vault of the DPU to provide virtual TPMs managed by a virtual TPM manager to host Containers. The virtual TPM manager is configured into one or more DPU cores that act as a proxy for acting as a host to one or more containers.

In some embodiments, a system is configured for virtualizing a set of secure domains. The system includes at least one configured data processing unit (DPU) secure vault and a firmware Trusted Platform Module (TPM) in which the firmware TPM may be virtualized into multiple virtual TPMs managed by a virtual TPM manager. The DPU secure vault is partitioned to protect one or more firmware TPMs in which the firmware TPM is virtualized into multiple virtual TPMs managed by a virtual TPM manager. Also, one or more secure firmware TPMs are virtualized into one or more virtual sub-firmware TPMs. The hardware components configured in the host are disjointly configured to each other and each set of hardware components is configured to implement a respective secure domain. The hypervisor is configured to communicate with at least one virtual TPM driver and with the virtual TPM manager to host one or more virtual machines (VMs). In an alternate embodiment of the system, the DPU secure vault is partitioned to secure based on the partitioning, one or more firmware TPMs that have been virtualized and controlled by a virtual TPM manager that hosts a set of containers. Also, the virtual TPM manager is configured into one or more DPU cores that act as a proxy to host one or more containers.

Additionally, the techniques described in this disclosure may be performed as a method and/or by a system having non-transitory computer-readable media storing computer-executable instructions that, when executed by one or more processors, perform the techniques described above.

Example Embodiments

In the examples described herein, of deploying a data processing unit (DPU) secure vault into multiple security domains where each security domain is isolated and can be implemented by disjoint sets of hardware components that even if penetrated by malicious intrusions such as malware or other viruses, because of the compartmented configured component sets so that intrusions would not be able or are prevented from being widely disseminated across the fabric network.

In some examples, a method and system provide moving the Root of Trust (ROT) of a host from the host such as an x86 server or an advanced reduced instruction set computer (RISC) machine (ARM) to a network fabric by establishing a trust via multiple virtual Trusted Platform Modules (TPMs) that define the ROT and can be managed by a virtual TPM manager across a set of virtual machines or containers of a host of the network fabric.

The methods and systems described herein may further include partitioning the secure vault of the DPU into multiple security domains. These multiple security domains may include, for example, an ARM trust zone domain, an ARM core domain, an x86 infrastructure domain, and a user domain. A fTPM may further be secured by an ARM code domain of secure vault (i.e., the fTPM can be secured by arm core domain) . . . . Each security domain may be implemented by a disjoint set of hardware components. Further, each domain may provide a separate hardware electronic fuse (eFuse) programming, and a number of buses may be connected to each domain.

In some embodiments, a secured vault including a DPU secured vault may include a System-on-Chip (SoC) electrical programmable fuse (eFuse). The keys of the DPU secure vault may be secured within the secure vault at the time of manufacture.

In some embodiments, the data processing unit (DPU) secure vault is backed by eFuse encrypted keys. In some embodiments, the DPU secure vault may be hard partitioned into multiple security virtual firmware TPMs, where each hardware partition may be implemented by a disjoint set of hardware components. Each domain is projected by a separate hardware eFuse programming and buses which are connected to each domain. Due to this physical layout, the domains are free from any kind of side-channel attacks. The separate hardware layout resulting from the eFuses partitions allows for security domains to be kept separate and for protecting multiple virtualized firmware TPMs. Therefore, even if one of the virtualized firmware TPMs is hacked, other virtualized firmware TPMs can remain operational.

In some embodiments, the secure vault with larger memory can be supported and can serve larger key storage for applications by the firmware trusted platform module (TPM). The firmware TPM may be virtualized and protected by security domains of the DPU secure vault (the secure vault-backed firmware TPM). In some embodiments, the firmware TPM may be used to hold, secure, and manage cryptographic keys and certificates for services such as disk encryption, Root of Trust booting, verifying the authenticity of hardware (as well as software), and password management.

In some embodiments, the firmware TPM may have the following characteristics: For example, the firmware TPM may be configured as a dedicated crypto processor to assist in ensuring the device boots into a secure and trusted state. In some embodiments, the firmware TPM may be configured to contain the manufacturer's keys and software for device encryption and defines hardware-Roots-of-Trust (RoTs) as part of the Trusted Platform Module (TPM) specification. Once the virtualized firmware TPM is initialized, the firmware TPM will be again partitioned into multiple virtual sub-firmware TPMs and will be managed by the virtual TPM manager. To support both VM and containers, the following implementation is configured in which the virtual firmware TPM is chosen to have less impact or changes with existing security solutions and leverages the firmware TPM style open APIs.

The present disclosure describes systems and methods to use a virtualized firmware TPM for VMs and Containers by partitioning the secure vault-backed firmware TPM into a set of $vTPM_1$ to $vTPM_n$ for use by a virtual TPM manager in a set of DPU cores, and in the case of containers to act as a proxy for the containers $POD_1$ to $POD_n$.

Turning now to the figures, FIG. 1 illustrates an architecture of a virtualizing firmware TPM for hosting by a virtual manager, multiple VMs according to some embodiments. In FIG. 1, a host 100 is configured with a set of components of a DPU 10. The host 100 may include any computing resources to the network such as data processing, data storage, and resource sharing among the client devices within the network fabric, among other services. As used in the present specification and/or in appended claims, the term 'fabric' means any mesh of connections between network devices within the network fabric such as, for example, access points, switches, routers that transports data to a destination, client devices, and other computing devices. The DPU 10 includes a DPU secure vault 15, a secure vault-backed firmware TPM 20, a set of virtual TPMs ($vTPM_1$ (25) to $vTPM_n$ (30)), a virtual TPM manager 35 in the DPU cores, a hypervisor 40, a set of VMs ($VM_1$ (45) to $VM_n$ 50). Each of the VMs is integrated with a vTPM driver vTPM driver 55, vTPM driver 56).

In some embodiments, The secure vault-backed firmware TPM 20 is partitioned into a set of multiple virtual TPMs ($vTPM_1$ (25) to $vTPM_n$ (30)). The DPU secure vault 15 may be partitioned into multiple partitions for multiple security domains, and for protecting the firmware TPM that is virtualized into multiple virtual firmware TPMs that are controlled by the virtual TPM manager 35. The secure fTPM can be virtualized into virtual sub-firmware TPMs corresponding to the virtual TPMs ($vTPM_1$ (25) to $vTPM_n$ (30)). The virtual firmware TPM is integrated or connected to the secure vault-backed firmware TPM 20 to protect its security domains.

In some embodiments, the firmware TPM (i.e., the secure vault-backed firmware TPM 20) is used to hold, secure, and manage cryptographic keys and certificates for services such as disk encryption, Root of Trust booting, verifying the authenticity of hardware (as well as software), and password management. The secure vault-backed firmware TPM 20 may be configured as a dedicated crypto-processor to help ensure the device boots into a secure and trusted state and contain the manufacturer's keys and software for device encryption. It may also define hardware-roots-of-trust as part of the Trusted Platform Module (TPM) specification. In some embodiments, once the secure vault-backed firmware TPM 20 is initialized, it will be again partitioned into multiple sub-firmware TPMs and will be managed by the virtual TPM manager 35 in the DPU cores. In one example, the DPU ARM cores may include the BLUEFIELD®-3 DPU developed and distributed by NVIDIA® Corporation. To support the VMs (and containers of FIG. 2), the following implementation is configured in which the firmware TPM is chosen to have less impact or changes with existing security solutions and leverages the standard TPM style open APIs. In one example, the keys of the DPU secure vault 15 may be secured within the secure vault at the time of manufacture in order to avoid any potential for the keys to be compromised.

In some embodiments, the firmware TPM is implemented so there is a much larger secure vault may be configured in the host instead of a hardware HSM (i.e., replacing the need for a licensed secure key store or HSM). The vTPM manager 35 may be configured as a TPM style implementation but may not be implemented as an actual hardware TPM in which there is synchronization and trust between DPUs as the trust between DPUs has already been established in the Fabric-root-of-trust model via a trust identity server. In some embodiments, by partitioning of the secure vault-backed firmware TPM 20, the enabled sharing of vTPMs, (and also possibly the sharing of DPU HSMs). The vTPM proxy may be required or needed in case of implementing the hypervisor 40 to expose a vTPM device created by the vTPM manager 35 to a VM (i.e., $VM_1$ 45 to $VM_n$ 50). Hypervisor 40 is not needed in the case of bare metal implementation for containers in an application execution environment (i.e., an operating system (OS) and the container engine without an abstraction layer as shown in FIG. 2).

In some embodiments, other than the built-in keys, the eFuses can be configured to store device security related to control and status bits. These are optional and dependent on the firmware and whether it is required to use the other features.

Figure 2:
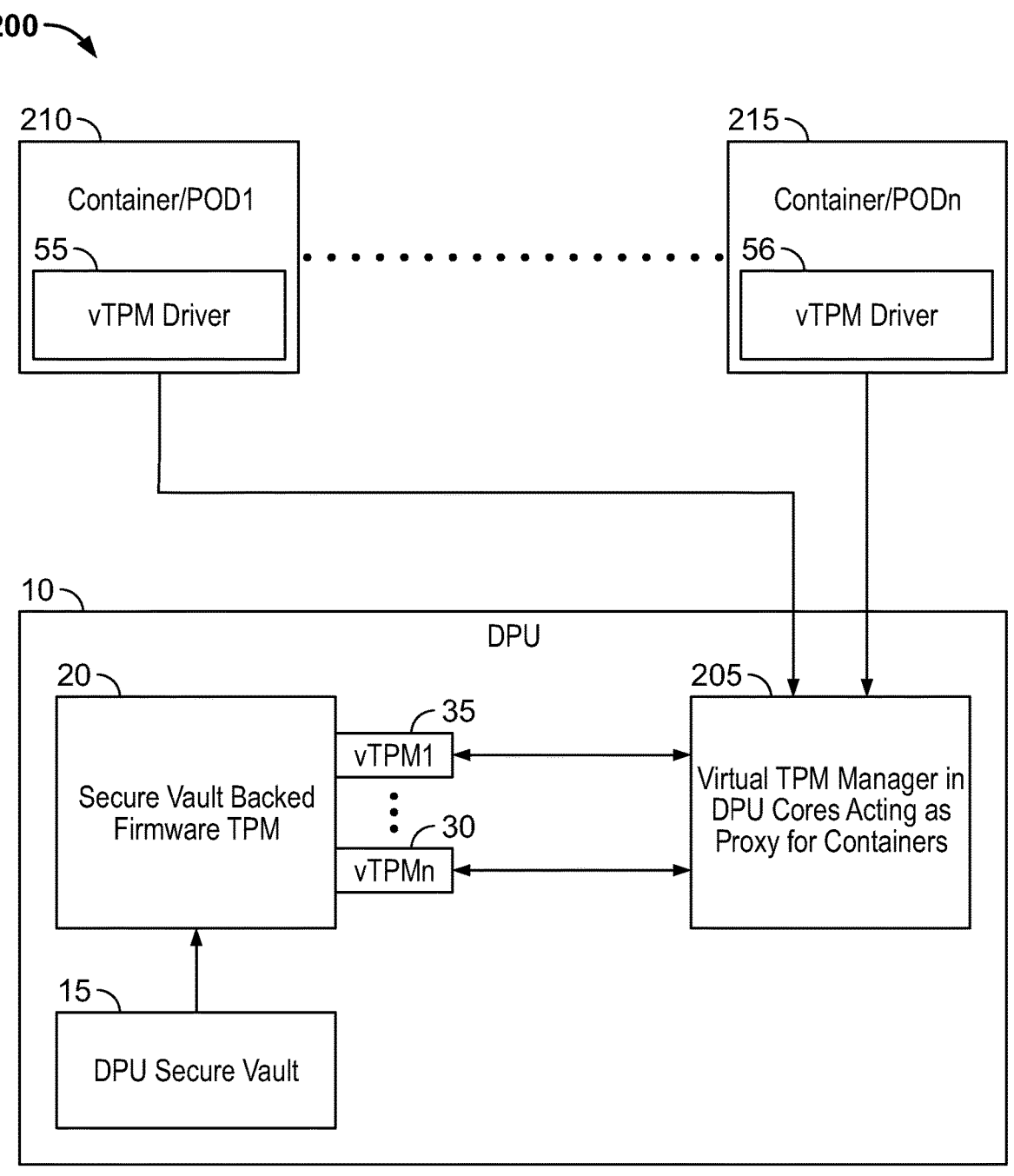
FIG. 2 illustrates an architecture of a virtualizing firmware Trusted Platform Module (TPM) for multiple containers according to some embodiments.

FIG. 2 illustrates an architecture of a virtualizing firmware TPM for multiple containers according to some embodiments. In FIG. 2 and similar to FIG. 1 except it is configured without the abstraction layer of the hypervisor. In FIG. 2, the host 200 is configured with a set of components that include a DPU secure vault 15, a secure vault backed firmware TPM 20, a set of virtual TPMs ($vTPM_1$ (25) to $vTPM_n$ (30)), a virtual TPM manager 205 in the DPU cores. The virtual TPM manager 205 acts as a proxy for each container of a set of containers (Container/$POD_1$ (210) to Container/$POD_n$ (215)). Each of the containers has its own virtual TPM driver (e.g., vTPM driver 55 and vTPM driver 56).

In some embodiments, the secure vault-backed firmware TPM 20 is partitioned into a set of virtual firmware TPMs ($vTPM_1$ (25) to $vTPM_n$ (30)). The DPU secure vault 15 may be partitioned into multiple security domains, and each firmware TPM is controlled by the virtual TPM manager 35. The secure firmware TPM are virtualized into a set of virtual sub-firmware TPMs corresponding to the virtual firmware TPMs ($vTPM_1$ (25) to $vTPM_n$ (30)). The virtualized firmware TPM is integrated or connected to the secure vault-backed firmware TPM 20 to protect its security domains.

In some embodiments, the firmware TPM (i.e., the secure vault-backed firmware TPM 20) is used to hold, secure, and manage cryptographic keys and certificates for services such as disk encryption, Root of Trust booting, verifying the authenticity of hardware (as well as software verification), and password management. The secure vault-backed firmware TPM 20 may be configured as a dedicated crypto-processor to help ensure the device boots into a secure and trusted state and contain the manufacturer's keys and software for device encryption. It may also define hardware-roots-of-trust as part of the firmware Trusted Platform Module (TPM) specification. In some embodiments, once the secure vault-backed firmware TPM 20 is initialized, it will be again partitioned into multiple sub-firmware TPMs (vTPM$_n$) and will be managed by the virtual TPM manager (vTPM manager) 35 in the DPU cores. To host the containers of FIG. 2, the following implementation is configured in which the virtualized firmware TPM is chosen to have less impact or changes with existing security solutions and leverages the standard TPM style open APIs.

In some embodiments, the secure vault-back firmware TPM 20 is certified by a Secure Unique Device Identifier (SUDI) certificate stored in the hardware of the host 200. For example, the SUDI certificate may be encrypted with a chip-specific key and stored inside the ARM core secure domain of the DPU of the host 200. The firmware TPM may also be provided from the flash memory of the host 200 and authenticated first before use.

FIG. 3 illustrates an exemplary flowchart for virtualizing a firmware Trusted Platform Module (TPM) to host one or more Virtual Machines (VMs) according to some embodiments. In FIG. 3, flowchart 300 illustrates an exemplary process for virtualizing the Hardware Security Module (HSM) for a host 100 to make VMs more secure using a Fabric-ROT and a virtualized DPU secure vault. The Flowchart 300, at step 310, includes configuring a host 100 to operably couple one or more components to virtualize the firmware-backed TPM for securing one or more Virtual Machines (VMs). At step 315, the secure vault-backed firmware TPM may be partitioned into multiple virtual firmware TPMs of vTPM$_1$ 25 to vTPM$_n$ 30. At step 320, the Data Processing Unit (DPU) 10 is hardware partitioned (similar to the virtual TPM) into multiple security domains that are each backed by a secure Intellectual Property (IP). At step 325 the virtual TPM manager 35 is configured in a set of DPU cores, and each core is siloed by one or more vTPMs partitioned from the secure vault-backed firmware TPM.

At step 330, one or more domains are configured in a disjoint set of hardware components associated with one or more vTPMs partitioned from the secure vault-backed firmware TPM. At step 340 a set of components that may include a separate hardware electronic fuse (eFuse) programming and buses may be connected to each domain to enable the creation of a Root of Trust (ROT) within the virtual TPM manager in the DPU cores. At step 345, the secure vault of the firmware-backed TPM may be configured to support an increased size configured memory that serves as storage for an application using the firmware TPM and which is protected by one of the security domains of the DPU secure vault. At step 350, in an abstract layer, a hypervisor may be configured with the virtual TPM manager to expose one or more vTPM devices by the virtual TPM manager 35 of the set of VMs. In some embodiments, the firmware TPM is used to hold, secure, and manage cryptographic keys and certificates for services such as disk encryption, ROT booting, verifying the authenticity of hardware (as well as software), and password management;

In some embodiments, once the firmware TPM is initialized, the firmware TPM may be partitioned into multiple sub-firmware TPMs managed by the virtual TPM manager (the firmware TPM is chosen to have less impact or changes with existing security solutions and leverages the standard TPM style open Application Programming Interface (APIs)) that enables the virtualizing of the DPU HSM and exposing virtualized DPU HSMs as a software-defined network accelerated processing (SNAP) device to x86 infrastructure domains. The vTPM proxy is only needed or required in case of implementing a hypervisor to expose a vTPM device created by a vTPM manager to the VM (the hypervisor is not needed in the case of bare metal implementation for containers).

FIG. 4 illustrates an exemplary flowchart for virtualizing a firmware Trusted Platform Module (TPM) to host one or more containers according to some embodiments. In FIG. 4, flowchart 400 illustrates an exemplary process for virtualizing the Hardware Security Module (HSM) for a host 100 to make Containers more secure using a Fabric-ROT and a virtualized DPU secure vault. The flowchart 400, at step 410, includes configuring a host 200 to operably couple one or more components to virtualize the firmware-backed TPM for hosting one or more containers. At step 415, the secure vault-backed firmware TPM may be partitioned into multiple virtual firmware TPMs of vTPM1 25 to vTPMn 30. At step 420, the Data Processing Unit (DPU) 10 is hardware partitioned (similar to the virtual firmware TPM) into multiple partitions for configuring one or more security domains and each may be backed by a secure Intellectual Property (IP). At step 425 the virtual TPM manager 35 is configured in a set of DPU cores acting as a proxy for a set of containers (Container/POD$_1$ 210 to Container/POD$_n$ 215), and each core is siloed by one or more vTPMs partitioned from the secure vault backed firmware TPM.

At step 430, one or more domains are configured in a disjoint set of hardware components associated with one or more vTPMs partitioned from the secure vault-backed firmware TPM. At step 440 a set of components may include a separate hardware electronic fuse (eFuse) programming and buses may be connected to each domain to enable the creation of a Root of Trust (ROT) within the virtual TPM manager in the DPU cores. At step 445, the secure vault of the firmware-backed virtual TPM may be configured to support an increased size configured memory that serves as storage for an application using the firmware virtual TPM and which is protected by the DPU secure vault. At step 450, in an abstract layer, a hypervisor may be configured with the virtual TPM manager to expose one or more vTPM devices by the virtual TPM manager 35 of the set of Containers (Container/POD$_1$ 210 to Container/POD$_n$ 215). In some embodiments, the TPM is used to hold, secure, and manage cryptographic keys and certificates for services such as disk encryption, ROT booting, verifying the authenticity of hardware (as well as software), and password management.

In some embodiments, once the firmware TPM is initialized, the virtualized firmware TPM may be partitioned into multiple virtual sub-firmware TPMs managed by the virtual TPM manager (the virtual firmware TPM is chosen to have less impact or changes with existing security solutions and leverages the standard TPM style open Application Programming Interface (APIs)) enables the virtualizing of the DPU HSM and exposing virtualized DPU HSMs.

Figure 5:
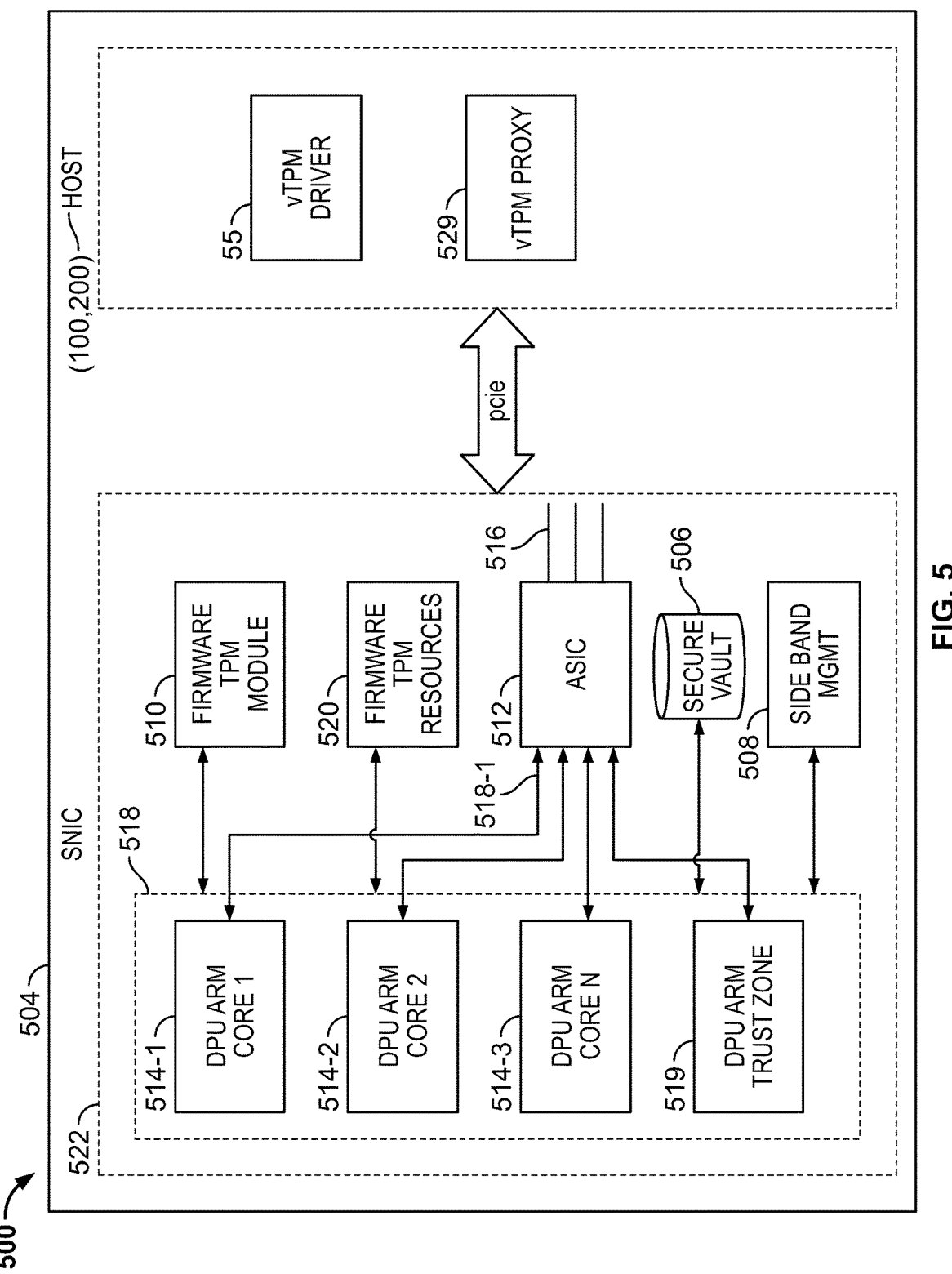
FIG. 5 illustrates a system-architecture diagram of a network fabric that utilizes a device with a set of DPU ARM cores with virtual firmware TPM resources and a host, according to some embodiments.

FIG. 5 illustrates a system-architecture diagram of a network fabric that utilizes a device with a set of DPU ARM cores with virtual firmware TPM resources and a host, according to an example of the principles described herein. The device 522 disposed in a smart network interface card (SNIC) 504 may be used in virtualizing with the firmware TPM of a Root-of-Trust (ROT) within a network fabric such as an x86 server or an advanced reduced instruction set computer (RISC) machine (ARM). In other words, the present systems and methods describe moving the ROT of a host device from the device 522 (e.g., an x86 server or ARM) to a network fabric associated with the virtualizing of the firmware TPM.

However, the device 522 with the ARM trust zone that includes the host 100 (or host 200) may further include any hardware and/or software that may be used to provide the processes and methods described herein such as, for example, a processor (e.g., a multi-core central processing unit (CPU)), a number of data storage device(s), data packet transmission devices, graphics processing unit(s) (GPUS), and field-programmable gate arrays (FPGAs), among other computing elements. The device 522 may further perform any encryption/decryption, firewall processing, transmission control protocol/internet protocol (TCP/IP), and hypertext transfer protocol (HTTP) processing, virtualization, load balancing, and data path optimization. An application-specific integrated circuit (ASIC) 512 may be included that may be customized to perform one or more of the processes described herein. The ASIC 512 may include a number of input communication lines 516 to allow for in-band communication with the ASIC 512. A sideband management device 508 may also be included within the smart network interface card (SNIC) 504 to provide for out-of-band communications to be received.

In one example, the in-band and out-of-band communications may include management flows that allow for the elements of the SNIC 504 to be managed. Further, the in-band and out-of-band communications may include traffic flows that include data packets to be processed with the SNIC 504 and/or the device 522.

The device 522 may further include a number of data processing unit (DPU) ARM cores 514-1, 514-2, 514-3 . . . 514-N, of the set of ARM cores where N is any integer greater than or equal to 1 (collectively referred to herein as DPU ARM core(s) 514-N unless specifically addressed otherwise) that are integrated with the virtual TPM manager 35 of FIGS. 1-2. In one example, the DPU ARM cores 514-N may execute a LINUX kernel. The DPU ARM cores 514-N are integrated with the DPU ARM Trust Zone 519 in configuration 518 and connected 518-1 to the ASIC 512. Further, the DPU ARM cores 514-N may be used to execute an image for device 522 based on an appropriate image identified by a SNIC sideband management controller (BMC) 508. In one example, the DPU ARM cores 514-N may include the BLUEFIELD-3 DPU developed and distributed by NVIDIA® Corporation.

The device 522 may further be operably connected or include a secure vault 506. The secure vault 506 may store a number of keys that may be used to verify the virtual firmware TPM resources 520 with the host 100 or host 200 (i.e., verify software and/or firmware of the firmware module 510 of the host 100, the host 200 the DPU ARM cores 514-N, the ASIC 512, and/or the device 522, obtain an IP address for the host 100 or host 200, and perform other security-related processing). Device 522 and host 100 or host 200 have access to the secure vault 506 in order to perform these functions. In one example, the keys of the secure vault 506 may be secured within the secure vault 506 at the time of manufacture of the DPU secure vault 15 (of FIGS. 1-2) in order to avoid any potential for the keys being compromised.

The virtual firmware TPM resources 520 (i.e., the secure vault-backed firmware TPM 20, the virtual TPM manager 35, etc.) provide a trusted secure enclave including a level of trust established with the network fabric 500 for the security and trust functions executed on behalf of the network fabric 500. The ROT may be initiated in the management plane or may be deployed in the data plane. Thus, in the examples described herein, the definition of the network fabric 500 may include either a production fabric or a management fabric, or a combination of both. As used in the present specification and the appended claims, the term "data plane" is meant to be understood broadly as any function or process that forwards data packets from one device to another. As used in the present specification and the appended claims, the term "control plane" is meant to be understood broadly as any function or process that determines which path to use when transmitting data including through the use of routing protocols. Further, as used in the present specification and in the appended claims, the term "management plane" is meant to be understood broadly as any function or process that is used to control and monitor devices within the network.

Trust authority (i.e., DPU ARM Trust Zone 519) is the ROT of the entire system. The trust authority may reside within the data/production fabric in a situation where all management and administration activities are performed in-band (e.g., via the input communication lines 516), or in the management fabric in a situation where all management and administration activities are performed out-of-band (e.g., via the sideband management device 508). In the latter case, the data fabric establishes trust with a trusted authority within the management fabric. Once the trust is established, the data fabric may serve as a conduit on behalf of the trust authority. Likewise, the SNIC 504 may establish trust with the trust authority in the network fabric 500 (management or data) and may serve as a conduit for the corresponding host 100 and the operating system (OS)/applications hosted. The vTPM proxy 529 is only needed or required in case of implementing a hypervisor to expose a vTPM device created by a vTPM manager to the VM (the hypervisor is not needed in the case of bare metal implementation for containers). Each of the VMs is integrated with a vTPM driver (i.e, vTPM driver 55 shown in FIG. 5).

As depicted in FIG. 5, the device 522, is a network device, coupled to the host 100 that provides functionality and services to a number of client devices within the network fabric 500. The device 522 may include any computing resources to the network such as data processing, data storage, and resource sharing among the client devices within the network fabric 500, among other services. As used in the present specification and in the appended claims, the term 'fabric" means any mesh of connections between network devices within the network fabric 500 such as, for example, access points, switches, and routers that transport data to a destination, client devices, and other computing devices. It may be appreciated that the configuration of the SNIC 504, the device 522, the network fabric 500, host 100 or host 200, and other components described with reference to FIG. 5 is merely illustrative and that other implementations may be utilized.

Figure 6:
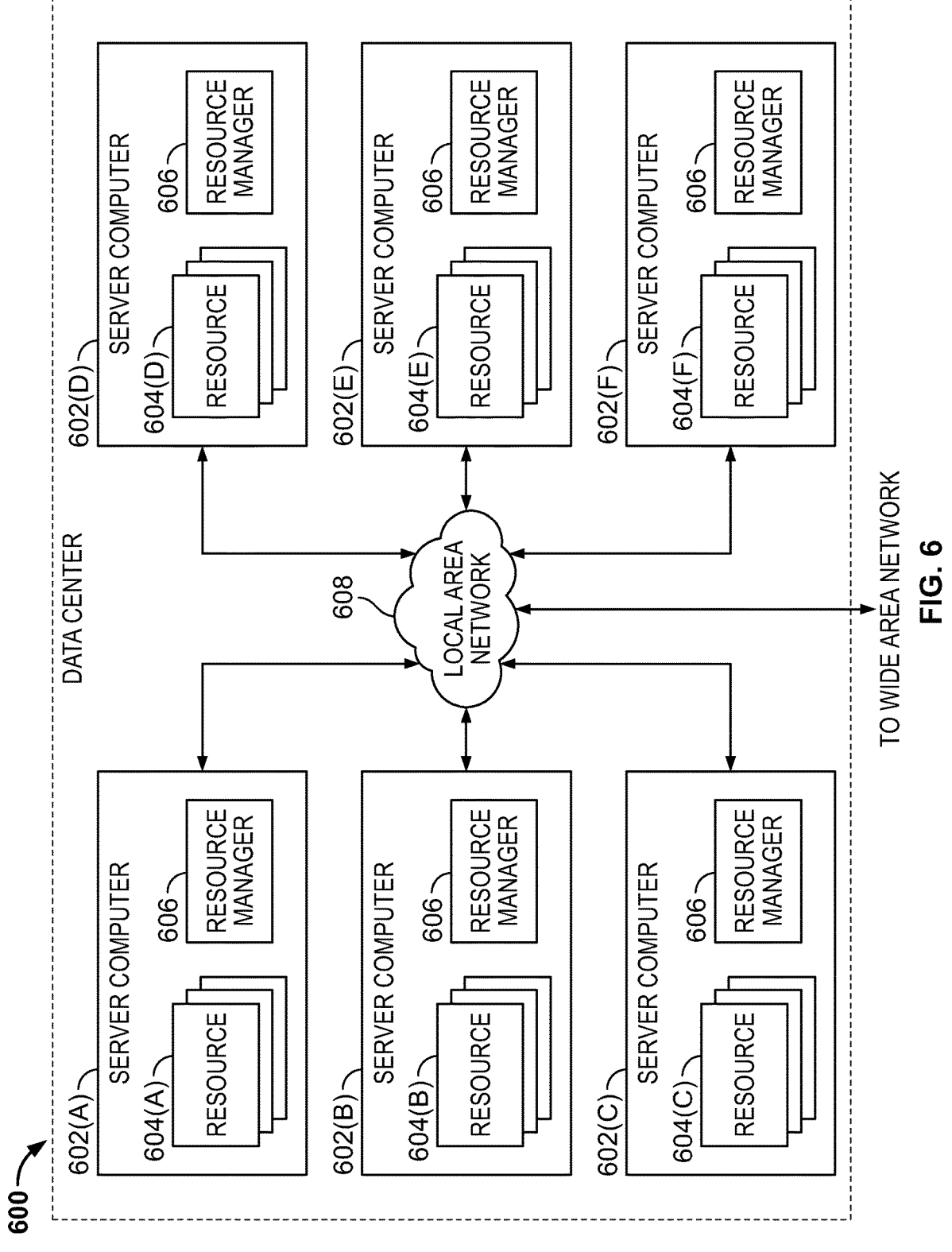
FIG. 6 illustrates a computing system diagram illustrating a configuration for a data center that may be utilized according to some embodiments.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602(N)" or in the plural as "the server computers 602(N)") for providing computing resources. In some examples, the resources and/or server computers 602(N) may include, or correspond to, any type of networked device (i.e., device 522 or SNIC 504 of FIG. 5) described herein. Although described as servers, server computers 602(N) may comprise any type of networked devices, such as servers, switches, routers, hubs, bridges, gateways, modems, repeaters, access points, etc.

The server computer 602(N) may be a standard tower, rackmount, or blade server computer configured appropriately for providing computing resources. In some examples, the server computers 602(N) may provide computing resources 604 including data processing resources such as VM instances and containers (of FIGS. 1-2) or hardware computing systems, database clusters, computing clusters, storage clusters, data storage resources, database resources, networking resources, virtual private networks (VPNs), and others. Some of the server computers 602(N) may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602(N). Server computer 602 (N) in the data center 600 may also be configured to provide network services and other types of services.

In the example data center 600 shown in FIG. 6, an appropriate Local Area Network (LAN) 608 may also be utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602(N). It may be appreciated that the configuration of the data center 600 described with reference to FIG. 6 is merely illustrative and that other implementations may be utilized.

In some examples, the server computers 602(N) and or the computing resources 604(N) may each execute/host one or more tenant containers and/or virtual machines to perform techniques described herein.

In some instances, the data center 600 may provide computing resources, like tenant containers, VM instances, VPN instances, and storage, on a permanent or as-needed basis. Among other types of functionality, the computing resources provided by a cloud computing network may be utilized to implement the various services and techniques described herein. The computing resources 604(N) provided by the cloud computing network may include various types of computing resources, such as data processing resources like tenant containers and VM instances, data storage resources, networking resources, data communication resources, network services, VPN instances, and the like.

Each type of computing resource 604(N) provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604(N) not mentioned specifically herein.

The computing resources 604(N) provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations and are one illustrative example of a data center 600 that may be utilized to implement the technologies disclosed herein and described herein with regard to, for example, FIGS. 1 through 5.

Figure 7:
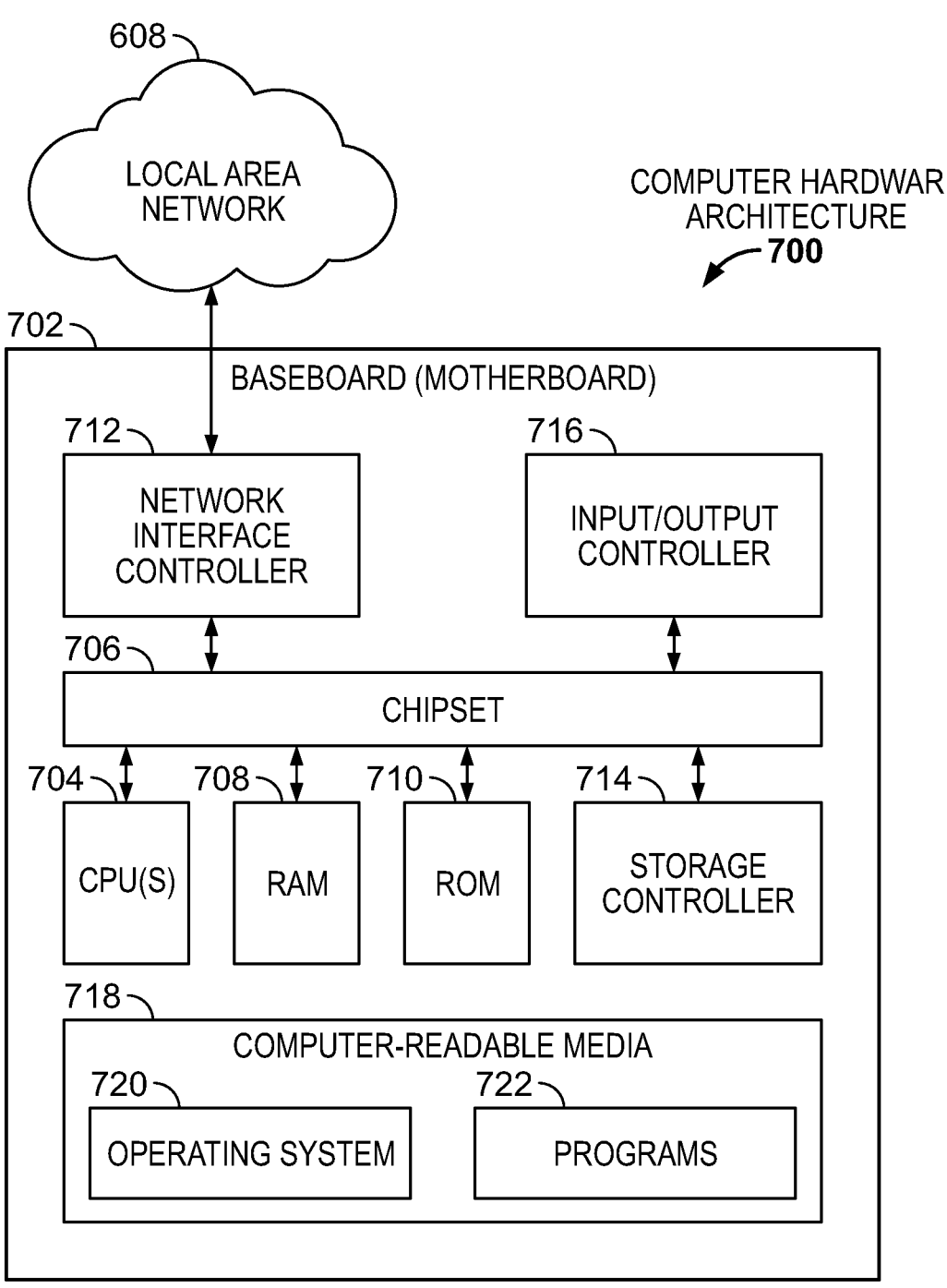
FIG. 7 illustrates a computer architecture diagram showing an example of computer hardware architecture for implementing a computing device that may be utilized to implement aspects according to some embodiments.

FIG. 7 illustrates a computer architecture diagram showing an example computer hardware architecture for implementing a computing device that may be utilized to implement aspects of the various technologies presented herein. The example computer hardware architecture ("computer") 700 shown in FIG. 7 illustrates the host 100, host 200, SNIC 504, device 522 computing devices, computing devices within a network fabric 500 and/or a workstation, a desktop computer, a laptop, a tablet, a network appliance, an e-reader, a smartphone, or other computing device, and may be utilized to execute any of the software components described herein. The computer 700 may, in some examples, correspond to a network device (e.g., the host 100, the host 200, computing devices within the network fabric 500) described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPU 704 may be a standard programmable processor that performs arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPU 704 and the remainder of the components and devices on the baseboard 702. The chipset 706 may provide an interface to a RAM 708, used as the main memory in the computer 700. The chipset 706 may further provide an interface to a computer-readable storage medium such as read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network. The chipset 706 may include functionality for providing network connectivity through a Network Interface Controller (NIC) 712, such as a gigabit Ethernet adapter. The NIC 712 is capable of connecting the computer 700 to other computing devices within the SNIC 504 and external to the SNIC 504. It may be appreciated that multiple NICs 712 may be present in the computer 700, connecting the computer to other types of networks and remote computer systems.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of the physical state may depend on various factors, in different examples of this description. Examples of such factors may include but are not limited to, the technology used to implement the physical storage units, whether the storage device 718 is characterized as primary or secondary storage, and the like.

For example, computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700.

By way of example, and not limitation, computer-readable storage media may include volatile and non-volatile, removable, and non-removable media implemented in any method or technology. Computer-readable storage media includes but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX® operating system. According to another example, the operating system comprises the WINDOWS® Server operating system from MICROSOFT® Corporation of Redmond, Washington. According to further examples, the operating system may comprise the UNIX® operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPU 704 transitions between states, as described above. According to one example, the computer 700 has access to computer-readable storage media storing computer-executable instructions which, when executed by the computer 700, perform the various processes described above with regard to FIGS. 1 through 6. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may include one or more hardware processor(s) such as the CPU 704 configured to execute one or more stored instructions. The CPU 704 may comprise one or more cores. Further, the computer 700 may include one or more network interfaces configured to provide communications between the computer 700 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi®, and so forth. The programs 722 may comprise any type of programs or processes to perform the techniques described in this disclosure for the host 100, or the host 200. Programs 722 may enable the devices described herein to perform various operations.

Clause 1. A method of securing and virtualizing firmware trusted platform modules (TPMs) within a network fabric, comprising: operably coupling a set of components associated with a host comprising a data processing unit (DPU) secure vault and a firmware TPM; configuring the firmware TPM as a virtual firmware TPM; securing, by the DPU secure vault, the virtual firmware TPM into one or more virtual firmware TPMs based on one or more partitions configured with the DPU secure vault; and managing, by a virtual TPM manager communicatively coupled to the DPU secure vault, the one or more virtual TPMs for hosting a set of Virtual Machines (VMs).

Clause 2. The method of clause 1, further comprising: configuring a hypervisor to communicate with at least one virtual TPM driver and with the virtual TPM manager for hosting one or more virtual machines (VMs).

Clause 3. The method of clause 2, wherein each VM is configured with a separate virtual TPM driver.

Clause 4. The method of clause 3, wherein the hypervisor is configured as a virtual TPM proxy.

Clause 5. The method of clause 1, wherein the DPU secure vault is partitioned using an eFuse for separately securing one or more domains, and wherein firmware TPM is configured for use as a built-in HSM.

Clause 6. The method of clause 5, wherein at least one secure firmware TPM is virtualized for exposure to at least one VM configured with the host.

Clause 7. The method of clause 6, wherein the firmware TPM is configured to store private keys for encryption and to protect at least one VM at launch and throughout a life cycle of the at least one VM.

Clause 8. The method of clause 1, further comprising: in response to initializing of the firmware TPM, enabling one or more sub-firmware components associated with one or more virtual firmware TPMs which are managed by the virtual TPM manager.

Clause 9. A non-transitory computer-readable medium storing instructions that, when executed, cause a processor to perform operations, comprising: operably coupling a set of components associated with a host comprising a data processing unit (DPU) secure vault and a firmware trusted platform module (TPM); configuring the firmware TPM as a virtual firmware TPM; securing, by the DPU secure vault of the DPU, the virtual firmware TPM into one or more virtual firmware TPMs based on one or more partitions configured with the DPU secure vault; and managing, by a virtual TPM manager communicatively coupled to the DPU secure vault, the one or more virtual TPMs for hosting a set of containers.

Clause 10. The non-transitory computer-readable medium of clause 9, the operations further comprising: configuring the virtual TPM manager in one or more DPU cores to act as a proxy for hosting one or more containers.

Clause 11. The non-transitory computer-readable medium of clause 10, wherein each container is configured with a separate virtual TPM driver configured with the virtual TPM manager that acts as the proxy for each container.

Clause 12. The non-transitory computer-readable medium of clause 11, wherein the DPU secure vault is partitioned using an eFuse for separately securing one or more domains, and wherein the firmware TPM is configured for use as a built-in HSM.

Clause 13. The non-transitory computer-readable medium of clause 12, wherein at least one secure firmware TPM is virtualized for exposure to at least one container configured with the host.

Clause 14. The non-transitory computer-readable medium of clause 9, further comprising: in response to initializing of the firmware TPM associated with the TPM, enabling one or more sub-firmware components associated with one or more virtual firmware TPMs which are managed by the virtual TPM manager.

Clause 15. A system for virtualizing a firmware Trusted Platform Module (TPM) comprising: at least one data processing unit (DPU) secure vault; and a firmware TPM; wherein the DPU secure vault is partitioned into one or more security domains, wherein the firmware TPM is virtualized into at least one virtual firmware TPM, and wherein the one or more security domains of the DPU secure vault are configured to secure, the at least one firmware TPM is controlled by a virtual TPM manager.

Clause 16. The system of clause 15, wherein one or more secure firmware TPMs are virtualized into one or more virtual sub-firmware TPMs.

Clause 17. The system of clause 15, further comprising: one or more sets of hardware components that are disjointly configured to each other wherein each set of hardware components is configured to implement a respective secure domain.

Clause 18. The system of clause 15, further comprising: a hypervisor configured to communicate with at least one virtual TPM driver and with the virtual TPM manager to host one or more virtual machines (VMs).

Clause 19. The system of clause 16, wherein each VM is configured with a separate virtual TPM driver.

Clause 20. The system of clause 15, wherein the DPU secure vault is partitioned using an eFuse to separately secure one or more virtual firmware TPMs and wherein the firmware TPM is configured for use as a built-in HSM.

While the present systems and methods are described with respect to the specific examples, it is to be understood that the scope of the present systems and methods is not limited to these specific examples. Since other modifications and changes varied to fit particular operating requirements and environments will be apparent to those skilled in the art, the present systems and methods are not considered limited to the example chosen for purposes of disclosure and cover all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of securing and virtualizing firmware trusted platform modules (TPMs) within a network fabric, comprising:

operably coupling a set of components associated with a host, the host comprising a data processing unit (DPU) secure vault;

configuring a firmware TPM into a first virtual firmware TPM and a second virtual firmware TPM;

using one or more electronic fuses (eFuses), partitioning the DPU secure vault into multiple DPU hardware partitions with different security domains;

integrating the first virtual firmware TPM into a first DPU hardware partition of the DPU secure vault and the second virtual firmware TPM into a second DPU hardware partition of the DPU secure vault; and managing, by a virtual TPM manager communicatively coupled to the DPU secure vault, the first virtual firmware TPM and the second virtual firmware TPM for hosting a set of Virtual Machines (VMs).

2. The method of claim 1, further comprising:

configuring a hypervisor to communicate with at least one virtual TPM driver and with the virtual TPM manager for hosting one or more virtual machines (VMs).

3. The method of claim 2, wherein each VM is configured with a separate virtual TPM driver.

4. The method of claim 3, wherein the hypervisor is configured as a virtual TPM proxy.

5. The method of claim 1, wherein the first virtual firmware TPM is virtualized for exposure to at least one VM configured with the host.

6. The method of claim 5, wherein the first virtual firmware TPM is configured to store private keys for encryption and to protect at least one VM at launch and throughout a life cycle of the at least one VM.

7. The method of claim 1, further comprising:

enabling one or more sub-firmware components associated with the first virtual firmware TPM and the second virtual firmware TPM which are managed by the virtual TPM manager.

8. A non-transitory computer-readable medium storing instructions that, when executed, cause a processor to perform operations, comprising:

operably coupling a set of components associated with a host, the host comprising a data processing unit (DPU) secure vault;

configuring a firmware TPM into a first virtual firmware TPM and a second virtual firmware TPM;

using one or more electronic fuses (eFuses), partitioning the DPU secure vault into multiple DPU hardware partitions with different security domains;

integrating the first virtual firmware TPM into a first DPU hardware partition of the DPU secure vault and the second virtual firmware TPM into a second DPU hardware partition of the DPU secure vault; and managing, by a virtual TPM manager communicatively coupled to the DPU secure vault, the first virtual firmware TPM and the second virtual firmware TPM for hosting a set of Virtual Machines (VMs).

9. The non-transitory computer-readable medium of claim 8, the operations further comprising:

configuring the virtual TPM manager in one or more DPU cores to act as a proxy for hosting one or more containers.

10. The non-transitory computer-readable medium of claim 9, wherein each container is configured with a separate virtual TPM driver configured with the virtual TPM manager that acts as the proxy for each container.

11. The non-transitory computer-readable medium of claim 8, wherein the first virtual firmware TPM is virtualized for exposure to at least one VM configured with the host.

12. The non-transitory computer-readable medium of claim 8, further comprising:

enabling one or more sub-firmware components associated with the first virtual firmware TPM and the second virtual firmware TPM which are managed by the virtual TPM manager.

13. A system for virtualizing a firmware Trusted Platform Module (TPM) comprising:

one or more electronic fuses (eFuses);

at least one data processing unit (DPU) secure vault; and a firmware TPM;

wherein the DPU secure vault is partitioned, using the one or more eFuses, into multiple DPU hardware partitions with different security domains, wherein the firmware TPM is virtualized into a first virtual firmware TPM and a second virtual firmware TPM, wherein the first virtual firmware TPM is integrated into a first DPU hardware partition and the second virtual firmware TPM is integrated into the second DPU hardware partition, and wherein the first virtual firmware TPM and the second virtual firmware TPM are controlled by a virtual TPM manager.

14. The system of claim 13, wherein one or more secure firmware TPMs are virtualized into one or more virtual sub-firmware TPMs.

15. The system of claim 14, wherein each VM is configured with a separate virtual TPM driver.

16. The system of claim 13, further comprising:

one or more sets of hardware components that are disjointly configured to each other wherein each set of hardware components is configured to implement a respective secure domain.

17. The system of claim 13, further comprising:

a hypervisor configured to communicate with at least one virtual TPM driver and with the virtual TPM manager to host one or more virtual machines (VMs).

* * * * *